United States Patent [19]

Bush et al.

[11] 3,989,607

[45] Nov. 2, 1976

[54] SOLVENT EXTRACTION AND ELECTROWINNING OF ZINC AND COPPER FROM SULFATE SOLUTION

[76] Inventors: Philip D. Bush, 1937 Mt. Zion Drive, Golden, Colo. 80401; Derek W. Bailey, 777 Washington St., 905 Governors Park, Denver, Colo. 80203

[22] Filed: Aug. 21, 1975

[21] Appl. No.: 606,427

[52] U.S. Cl. ............................... 204/108; 204/119; 423/24; 423/100
[51] Int. Cl.[2] ...................... C25C 1/12; C25C 1/16
[58] Field of Search ................ 423/24, 100, 101 BE, 423/117; 204/106, 108, 119, 118

[56] References Cited
UNITED STATES PATENTS

| | | | |
|---|---|---|---|
| 3,573,182 | 3/1971 | Churchward et al. ................ | 423/24 |
| 3,666,446 | 5/1972 | Cook et al. ............................ | 75/117 |

OTHER PUBLICATIONS
*Solvent Extraction*, vol. II Society of Chemical Industry, London, pp. 1380–1381.

*Primary Examiner*—Earl C. Thomas
*Assistant Examiner*—Brian E. Hearn

[57] ABSTRACT

A process for separating zinc and copper values from an aqueous solution of copper and zinc salts having a pH of between about 0.5 and 6 is provided comprising:

a. contacting said aqueous solution with the copper salt of di-(2-ethylhexyl) phosphoric acid to form a zinc-containing organic phase and a copper-containing aqueous phase;

b. separating said zinc-containing organic phase from said copper-containing aqueous phase; and c. stripping said organic phase to form a solution of a zinc salt and di-(2-ethylhexyl) phosphoric acid.

6 Claims, 1 Drawing Figure

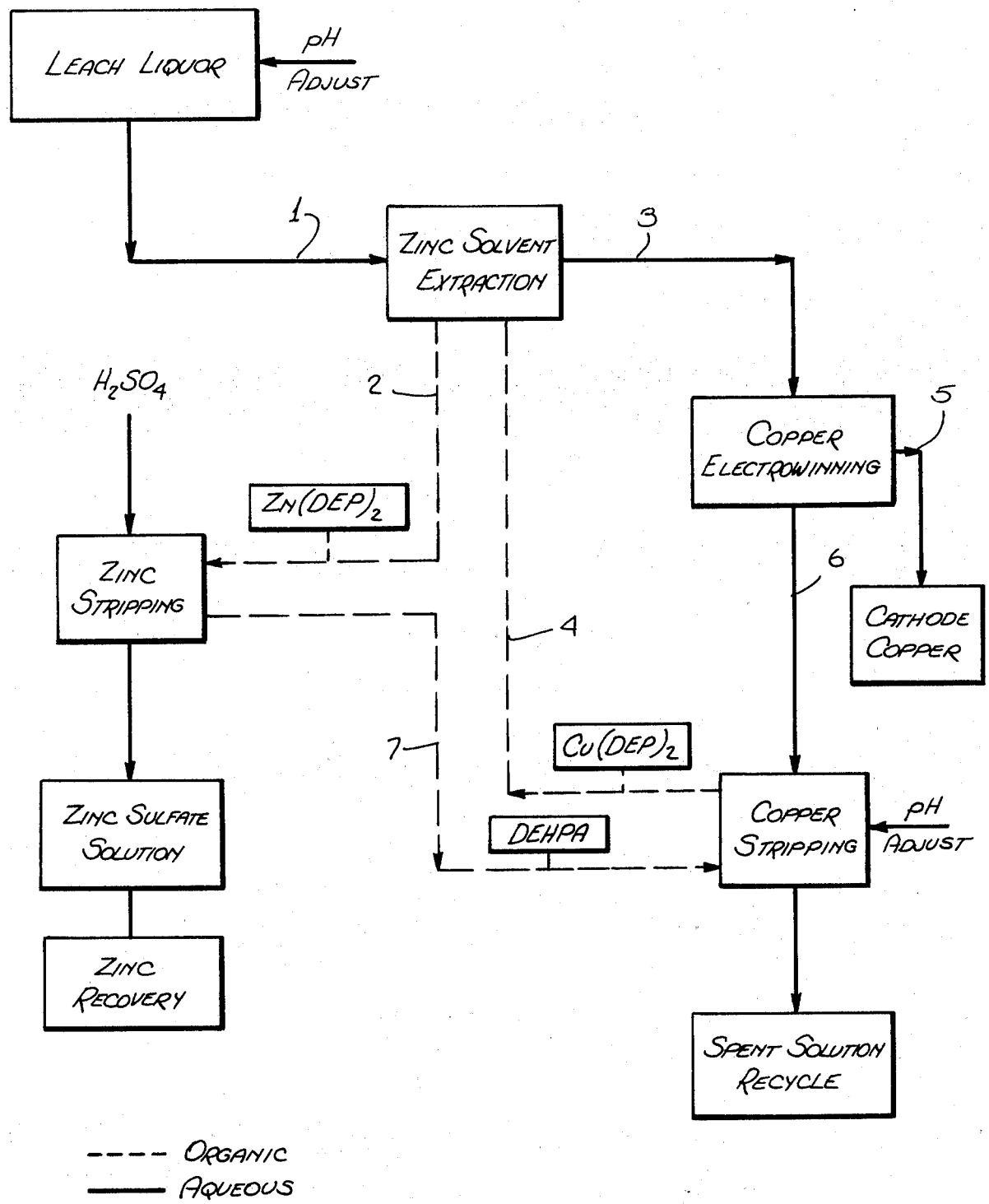

SOLVENT EXTRACTION AND ELECTROWINNING OF ZINC AND COPPER FROM SULFATE SOLUTION

BACKGROUND OF THE INVENTION

This invention is concerned with a process for selectively separating copper and zinc values from aqueous solutions containing these metals in salt form. More particularly, the present invention is concerned with a process for selectively recovering copper and zinc from aqueous solutions such as leach liquors and mine waters containing the copper and zinc as sulfate salts. The zinc and copper are separated in the form of aqueous salt solutions, which solutions may be further processed to obtain the metals.

Copper and zinc are found in many ores which can be separated and recovered by solubilizing the copper and zinc in the ore. Generally this is accomplished by roasting or leaching the ore with sulfuric acid to yield a solution containing zinc and copper sulfates. In the past, copper metal was recovered from this solution by electrowinning. The zinc was also recovered by electrowinning provided all the copper was first removed from solution. In order to remove all copper from solution, a series of electrolyses were performed in which a portion of the copper was first removed as pure metal from the solution by electrolysis. The remaining solution from this step was further depleted of copper by a second electrolysis which gave a less pure copper deposit at low current efficiency. Final traces of copper were then removed by cementation with zinc dust.

Another method for concentrating and recovering copper and zinc from aqueous solutions such as leach liquors involves the use of a water-immiscible organic extractant such as an organic hydrogen phosphate. In U.S. Pat. No. 2,992,894, for example, a process for concentrating and recovering copper and zinc from aqueous sulfate solutions is described wherein the solution is contacted with an organic hydrogen phosphate having at least one and not more than two hydrogens of the phosphoric acid replaced with an alkyl radical such as di-(2-ethylhexyl) phosphoric acid to produce a metal cation-loaded solvent which is separated from the solution. The solvent is then stripped with acid or base to produce a metal concentrate and regenerate the solvent. The metal concentrate in the stripping solution is then subjected to electrolysis to obtain the metals. The pH of the aqueous solution in this method must be such that the distribution coefficient for the metal to be extracted is at least 1 and not in excess of that pH value at which a metallic hydroxide precipitates. The preferred pH for copper extraction is 2.5 to 3.5 and the preferred pH for Zn is 1.5 to 4.0 according to this method.

However, the use of organic hydrogen phosphates such as di-(2-ethylhexyl) phosphoric acid to recover zinc from aqueous solutions containing zinc and copper sulfate results in an exchange of hydrogen ions in the organic phase for zinc ions in the aqueous phase. This produces an increase in acidity of the system and results in reduced zinc extraction since the exchange of these ions in the system is pH dependent.

Therefore, since a mole of acid is transferred to the aqueous phase for every mole of zinc or copper extracted into the organic phase, effective metal extraction is only achieved under one of two conditions. These are: (a) metal extractions from dilute solutions which result in relatively small amounts of metals being extracted with accompanying small pH changes; or (b) in systems which incorporate in-situ neutralization of the acid produced during extraction. However, the majority of hydro-metallurgical process schemes involve fairly concentrated metal salt solutions which therefore mandate an acid neutralization operation to satisfactorily utilize extractants such as organic hydrogen phosphates. While acid neutralization is technically feasible it has at least two economic drawbacks; the loss of organic reagent, and the loss of metal values trapped in any insoluble by-product of neutralization. Typically, lime is the acid neutralization reagent of choice in most industrial operations, because of cost and availability. The by-product of acid neutralization in a sulfate system using lime is a relatively insoluble solid (calcium sulfate), which is difficult to handle. More importantly, however, is the fact that insoluble by-products have the disadvantage of trapping expensive organic reagent including the copper and zinc organic phosphates in the calcium sulfate sludge that is produced. In addition, some amounts of copper and zinc hydroxides tend to be produced which are trapped with, and lost to, the calcium sulfate. The calcium sulfate precipitate requires a considerable amount of washing if entrained zinc and copper values are to be removed.

In still another method described in U.S. Pat. No. 3,573,182, selective extraction of zinc from solutions containing both zinc and copper ions is accomplished by using the calcium salt of an organic hydrogen phosphate in an organic solvent as the extractant. In this method a solution of copper and zinc sulfate is mixed with the calcium salt of di-(2-ethylhexyl) phosphoric acid, $(Ca(DEP)_2)$, in kerosene. Calcium sulfate precipitates from the mixture with the formation of $Zn(DEP)_2$ and $Cu(DEP)_2$. The $Cu(DEP)_2$ reacts with $ZnSO_4$ in the aqueous phase to form $Zn(DEP)_2$ and $CuSO_4$ with the $Zn(DEP)_2$ being transferred to the organic phase. The organic phase is then scrubbed with acid to yield $ZnSO_4$ and di-(2-ethylhexyl) phosphoric acid (DEPH). The aqueous phase containing copper sulfate and the zinc sulfate obtained by scrubbing is subjected to electrolysis to obtain copper and zinc metal respectively.

By using calcium di-(2-ethylhexyl) phosphate according to this method, no hydrogen ions are transferred to the aqueous phase. However, an inherent disadvantage of this process is the formation of a calcium sulfate precipitate which as previously discussed may entrap organic reagents and should be avoided.

The present invention alleviates the problems associated with the aforementioned prior art processes by providing a method for selectively recovering zinc and copper from aqueous solutions containing these metals in salt form, preferably as sulfates, with a water-immiscible organic extractant, which method does not involve a transfer of hydrogen ions from the organic phase to the aqueous phase and does not include the formation of a precipitate as a by-product. Thus, the present method offers the following advantages:

1. Acid neutralization is not required during extraction.
2. Losses of entrained organic extractant and zinc and copper values in a precipitate such as calcium sulfate is eliminated since only free acid in the aqueous feed solution needs to be neutralized prior to extraction.

SUMMARY OF THE INVENTION

The present invention provides a process for recovering copper and zinc values from aqueous solutions of copper and zinc salts, such as copper and zinc sulfates in leach liquors, by employing a water-immiscible organic extractant comprising the copper salt of an organic phosphoric acid, preferably copper di-(2-ethylhexyl) phosphate.

The process comprises the steps of:

a. contacting an aqueous solution containing copper and zinc salts and having a pH of between about 0.5 and 6 with a water-immiscible organic extractant comprising the copper salt of di-(2-ethylhexyl) phosphoric acid to form a zinc-containing organic phase and a copper-containing aqueous phase, b. separating said zinc-containing organic phase from said copper-containing aqueous phase; and c. stripping said organic phase to form an aqueous solution of a zinc salt and di-(2-ethylhexyl) phosphoric acid.

The aqueous solution of the zinc salt may be further processed such as by electrowinning to obtain pure zinc metal. Similarly the copper-containing aqueous phase may be subjected to electrowinning to obtain cathode copper.

For purposes of brevity, the radical di-(2-ethylhexyl) phosphate which can be represented by the formula:

$$[C_4H_9CH(C_2H_5)CH_2]_2PO_4 -$$

will be referred to as DEP in the specification and the acid form of this radical will be referred to as DEHPA.

The copper salt of di-(2-ethylhexyl) phosphoric acid $(Cu(DEP)_2)$ is used as an organic extractant in the present process to preferentially extract zinc ion from an aqueous sulfate solution as $Zn(DEP)_2$ according to the following reaction:

$$Cu(DEP)_2 + ZnSO_4 \rightleftarrows (Zn(DEP)_2 + CuSO_4$$

An examination of the relationship beween equilibrium extraction coefficients and pH for copper and zinc extraction from aqueous solutions using di-(2-ethylhexyl) phosphoric acid, showed a significant selectivity of zinc over copper.

The present invention eliminates the need for the use of any neutralizing material in the organic extraction step for zinc recovery by the use of the copper salt of di-(2-ethylhexyl) phosphoric acid. Instead there is an exchange of copper ions in the solvent for zinc ions in solution. This does not change the acidity of the solution. Since zinc combines with the extractant in preference to copper, substantially complete exchange of copper and zinc occurs.

The present method can be adapted to a continuous operation for separating zinc from aqueous copper and zinc solutions by reacting the di-(2-ethylhexyl) phosphoric acid formed after stripping the zinc-containing organic phase with a portion of the copper-containing aqueous phase to form $Cu(DEP)_2$ which is then contacted with additional aqueous solution as in step (a). In this manner $Cu(DEP)_2$ is used to exchange zinc and then is continually regenerated for reuse by reaction of the separated copper solution and the di-(2-ethylhexyl) phosphoric acid obtained from stripping $Zn(DEP)_2$ with sulfuric acid.

The continuous method for separating zinc from aqueous solutions can be more particularly described with reference to the drawing.

BRIEF DESCRIPTION OF THE DRAWING

The drawing shows a flow diagram of a copper and zinc separation from a leach liquor using the copper salt of di-(2-ethylhexyl) phosphoric acid as the extractant.

DETAILED DESCRIPTION OF THE PREFERRED EMBODIMENTS

In the drawing, a leach liquor containing for example 75 g/liter copper and 25 g/liter Zn in the form of sulfates is first adjusted, if necessary, to a pH of between 0.5 and 6 and then led in stream 1 where it is contacted with copper di-(2-ethylhexyl) phosphate $(Cu(DEP)_2)$ to extract zinc into the organic phase as $Zn(DEP)_2$ leaving copper sulfate in the aqueous phase. The zinc-containing organic phase, $Zn(DEP)_2$ in stream 2 is stripped with dilute sulfuric acid to recover the zinc as a zinc sulfate solution and to generate di-(2-ethylhexyl) phosphoric acid (DEHPA) in stream 7. The zinc sulfate solution can then be subjected to electrowinning to recover zinc metal in a zinc recovery stage. The aqueous phase containing copper sulfate in stream 3 is led to a copper electrowinning circuit where a copper drop down to about 30 g/liter is taken to produce cathode copper in stream 5. The exit solution from electrowinning in stream 6 is then contacted in a copper stripping stage with the generated di-(2-ethylhexyl) phosphoric acid (DEHPA) in stream 7, to produce $Cu(DEP)_2$ in stream 4 which is recycled to the incoming leach liquor in stream 1. The spent dilute copper solution after reaction with DEPH is then either recycled to the leach (not shown) or discarded.

The pH of the aqueous leach solution containing the copper and zinc to be extracted should be at least about 0.5 and not more than 6. A pH substantially less than 0.5 will severely reduce the amount of zinc transferred from the aqueous phase to the organic phase. At pH's greater than about 6 there is the danger of forming a metallic hydroxide precipitate which is to be avoided. Preferably the pH should be from 1.5 to 4.5 for optimum extraction conditions and even more preferably at a pH of about 3.5.

Table I shows the results of several extractions of a leach liquor containing 41.0 g/l Cu and 13.8 g/l Zn using $Cu(DEP)_2$ as the extractant at various Organic-/Aqueous ratios (O/A). The pH of the liquor was initially about 3.4. Table II shows the results of several extractions of a leach liquor containing 54.8 gm/l Cu and 17.8 gm/l Zn using $Cu(DEP)_2$ in which the initial pH of the liquor was about 1.5. Both Tables show the equilibrium pH values of the aqueous phase for each extraction.

TABLE I

| Organic/ Aqueous Ratio | ZINC EXTRACTION FROM LEACH LIQUOR | | | | pH of Aqueous Phase |
|---|---|---|---|---|---|
| | Zinc-grams/liter | | Copper-grams/liter | | |
| | Organic | Aqueous | Organic | Aqueous | |
| 10/1 | 1.48 | 0.08 | 16.7 | 55.0 | 3.7 |
| 7/1 | 2.00 | 0.11 | 15.8 | 56.0 | 3.7 |
| 5/1 | 2.76 | 0.13 | 15.4 | 55.5 | 3.7 |
| 3/1 | 5.00 | 0.23 | 13.4 | 55.5 | 3.7 |
| 1/1 | 13.1 | 1.46 | 5.20 | 55.0 | 3.8 |
| 1/3 | 17.6 | 8.60 | 0.82 | 50.0 | 3.4 |
| 1/5 | 17.8 | 10.8 | 0.63 | 45.5 | 3.4 |
| 1/7 | 17.8 | 11.8 | 0.54 | 43.5 | 3.4 |

TABLE I-continued

ZINC EXTRACTION FROM LEACH LIQUOR

| Organic/ Aqueous Ratio | Zinc-grams/liter | | Copper-grams/liter | | pH of Aqueous Phase |
|---|---|---|---|---|---|
| | Organic | Aqueous | Organic | Aqueous | |
| 1/10 | 18.0 | 12.9 | 0.46 | 44.0 | 3.4 |

TABLE II

ZINC EXTRACTION FROM LEACH LIQUOR

| Organic/ Aqueous Ratio | Zinc-grams/liter | | Copper-grams/liter | | pH of Aqueous Phase |
|---|---|---|---|---|---|
| | Organic | Aqueous | Organic | Aqueous | |
| 10/1 | 1.81 | 0.16 | 16.0 | 76.0 | 3.7 |
| 7/1 | 2.54 | 0.22 | 14.7 | 75.5 | 3.7 |
| 5/1 | 3.52 | 0.26 | 13.7 | 76.6 | 3.7 |
| 3/1 | 5.79 | 0.43 | 11.1 | 78.4 | 3.6 |
| 1/1 | 11.80 | 5.75 | 1.28 | 71.6 | 2.7 |
| 1/3 | 7.20 | 15.0 | 0.32 | 60.0 | 1.9 |
| 1/5 | 4.70 | 16.8 | 0.22 | 57.0 | 1.8 |
| 1/7 | 4.00 | 16.8 | 0.17 | 55.5 | 1.6 |
| 1/10 | 3.20 | 17.3 | 0.14 | 55.5 | 1.5 |

Table I shows a pattern of increasing zinc loading of the organic phase as the organic/aqueous ratio decreases. At an initial pH of about 3.4, of the aqueous solution, the equilibrium pH values do not fluctuate appreciably over the range of organic/aqueous (O/A) ratios employed. In Table II however, the organic loading of zinc shows a reversal from the normal pattern of increasing loading at decreasing O/A ratios for O/A ratios less than unity. This is because the equilibrium pH values at O/A ratios less than unity continuously decrease from 2.7 at an O/A ratio of 1/1 to the pH of the solution itself, 1.5, at an O/A ratio of 1/10. The practical effect of these results is to suggest that the pH of the leach liquor to be extracted be most preferably adjusted to about 3.5 in order to achieve the best extraction of zinc using $Cu(DEP)_2$. However, in no event should the pH be less than about 0.5.

The $Cu(DEP)_2$ extractant can be prepared by reacting a copper salt such as copper sulfate with di-(2-ethylhexyl) phosphoric acid. In the continuous method shown in the drawing, the exit solution from the electrowinning circuit containing copper sulfate is reacted with the di-(2-ethylhexyl) phosphoric acid generated in the zinc stripping stage. It has also been found that in order to maximize the yield of $Cu(DEP)_2$, the pH of the exit solution should be adjusted to between about 1.0 and 6.0, preferably from 2 to 4.5 and most preferably to about 4.0.

Table III shows a series of extractions of a spent electrowinning solution containing 29.9 gm/l Cu, 20.0 gm/l $H_2SO_4$ at a pH of 0.6. The extractant was 20 volume % DEHPA in 75 vol % kerosene and 5 vol % isodecanol. Table IV shows a similar series of extractions from the same solution but raising its pH to 3.9 prior to extraction. Both tables show the equilibrium pH value for each extraction.

TABLE III

COPPER EXTRACTION EQUILIBRIUM

| Organic/ Aqueous Ratio | Copper-grams/liter | | pH of Aqueous Phase |
|---|---|---|---|
| | Organic | Aqueous | |
| 10/1 | <0.01 | 31.0 | 0.5 |
| 7/1 | <0.01 | 30.2 | 0.5 |
| 5/1 | <0.01 | 31.0 | 0.5 |
| 3/1 | <0.01 | 30.0 | 0.5 |
| 1/1 | <0.01 | 30.0 | 0.5 |
| 1/3 | <0.01 | 29.6 | 0.5 |

TABLE III-continued

COPPER EXTRACTION EQUILIBRIUM

| Organic/ Aqueous Ratio | Copper-grams/liter | | pH of Aqueous Phase |
|---|---|---|---|
| | Organic | Aqueous | |
| 1/5 | <0.01 | 29.2 | 0.6 |
| 1/7 | <0.01 | 30.0 | 0.6 |
| 1/10 | <0.01 | 29.6 | 0.6 |

TABLE IV

COPPER EXTRACTION EQUILIBRIUM

| Organic/ Aqueous Ratio | Copper-grams/liter | | pH of Aqueous Phase |
|---|---|---|---|
| | Organic | Aqueous | |
| 10/1 | 0.36 | 17.8 | 1.6 |
| 7/1 | 0.45 | 18.3 | 1.6 |
| 5/1 | 0.56 | 18.6 | 1.7 |
| 3/1 | 0.70 | 19.3 | 1.8 |
| 1/1 | 1.34 | 20.1 | 1.9 |
| 1/3 | 2.30 | 20.6 | 2.1 |
| 1/5 | 2.80 | 20.8 | 2.2 |
| 1/7 | 3.38 | 20.9 | 2.3 |
| 1/10 | 4.00 | 21.0 | 2.4 |

It is clear from Table III that copper loading on the extractant was reduced at equilibrium pH values below about 1.0 but increased appreciably at pH's above 1.0 as shown in Table IV. Theoretical maximum copper loading on a 20 Vol % DEPH solution is about 18 grams of copper/liter. Di-(2-ethylhexyl) phosphate copper salt was prepared by contacting $CuSO_4$ solution (20 gm/l Cu) with 20 Vol % DEHPA solution and maintaining an aqueous phase pH of about 4.0 by addition of 50% NaOH solution. Using this method, maximum copper loading was readily achieved on the DEHPA solution. A pH of 6 should not be exceeded because of the possibility of forming a copper hydroxide precipitate.

The stripping of zinc from $Zn(DEP)_2$ is accomplished by contacting $Zn(DEP)_2$ with from 5 to 15 volume percent aqueous sulfuric acid at room temperature. Table V shows the results of several experiments to strip zinc from $Zn(DEP)_2$ using 15 Vol % $H_2SO$ (165 gm/liter). The procedure used involved the loading of 20 Vol % (DEHPA) with zinc from 30 gm/l Zn as $ZnSO_4$ solution following which a series of batch separatory funnel shakeouts at various organic/aqueous ratios were performed. The organic phase contained 17.8 gm/liter Zn.

TABLE V

ZINC STRIPPING DATA

| Organic/ Aqueous Ratio | Organic Zn gm/l | Aqueous Zn gm/l |
|---|---|---|
| 10/1 | 2.65 | 165.0 |
| 7/1 | 0.41 | 130.0 |
| 5/1 | 0.11 | 99.0 |
| 3/1 | 0.43 | 58.0 |
| 1/1 | 0.02 | 18.6 |
| 1/3 | nil | 6.30 |
| 1/5 | 0.02 | 3.70 |
| 1/7 | nil | 2.75 |
| 1/10 | 0.04 | 1.95 |

As the data show, stripping was practically quantitative. It is preferred to use a solvent for the $Cu(DEP)_2$ in the present method. The solvent must be immiscible with water and capable of solubilizing both $Cu(DEP)_2$ and $Zn(DEP)_2$. Such solvents include kerosene, mixtures of kerosene and isodecane, gasoline and other water-immiscible petroleum solvents. Kerosene is most preferred because it is readily available, relatively inexpensive and safe to handle.

In general, the amount of copper in the $Cu(DEP)_2$ should be about equal to the amount of zinc in the aqueous solution on a molar basis for optimum separation. Volumes of organic or aqueous phases should be adjusted to bring about such preferred relative amounts.

Although the ratio of organic phase to aqueous phase is not critical to the invention, it is preferred to use organic/aqueous ratios less than unity because large volumes of organic solvents add significant cost to the process.

The above embodiments do not limit the scope of the present invention and may be varied in practice by those skilled in the art without departing from the ambit of the invention.

what is claimed is:

1. A process for the continuous separation of zinc and copper values from an aqueous solution containing zinc and copper sulfates having a pH of between about 0.5 and 6 comprising:
    a. contacting said aqueous solution with an organic extractant comprising copper di(2-ethylhexyl) phosphate to form an organic phase containing zinc di-(2-ethylhexyl) phosphate and an aqueous copper sulfate solution;
    b. separating said organic phase from said copper sulfate solution;
    c. stripping said organic phase with sulfuric acid to form a zinc sulfate solution and di-(2-ethylhexyl) phosphoric acid;
    d. subjecting a portion of said copper sulfate solution to electrowinning to separate copper metal therefrom;
    e. contacting a portion of said copper sulfate solution with said di-(2-ethylhexyl) phosphoric acid to form copper di-(2-ethylhexyl) phosphate; and
    f. returning said copper di-(2-ethylhexyl) phosphate for use in step (a).

2. The process of claim 1 wherein said organic extractant further comprises a water-immiscible organic solvent.

3. The process of claim 1 wherein the copper sulfate solution of step (d) is adjusted to a pH of between about 2.0 and 4.5 before contact with said di-(2-ethylhexyl) phosphoric acid.

4. The process of claim 1 which further comprises the step of electrowinning zinc metal from said zinc sulfate solution.

5. The process of claim 1 wherein the pH is from 1.5 to 4.5.

6. The process of claim 2 wherein said organic solvent is selected from the group consisting of kerosene, mixtures of kerosene and isodecane and gasoline.

* * * * *